United States Patent

[11] 3,576,318

| [72] | Inventors | Robert W. Spencer;<br>Robert S. L. Andrews, Rancocas, N.J. |
|---|---|---|
| [21] | Appl. No. | 813,451 |
| [22] | Filed | Apr. 4, 1969 |
| [45] | Patented | Apr. 27, 1971 |
| [73] | Assignee | Inductotherm Corporation<br>Rancocas, N.J. |

[54] FUME CONTROL METHOD AND APPARATUS
8 Claims, 3 Drawing Figs.

| [52] | U.S. Cl. | 263/46,<br>13/9 |
|---|---|---|
| [51] | Int. Cl. | F23m 5/00,<br>F23m 9/00 |
| [50] | Field of Search | 263/46;<br>13/9 |

[56] References Cited
UNITED STATES PATENTS

| 3,018,096 | 1/1962 | Rydinger | 13/9X |
| 3,127,462 | 3/1964 | Erni et al. | 13/9 |
| 3,428,301 | 2/1969 | Chermely | 263/46 |

Primary Examiner—John J. Camby
Attorney—Seidel, Gonda and Goldhammer

ABSTRACT: Apparatus and method for controlling fumes in an arc furnace. The fumes are collected by a circumferentially disposed duct whose cross-sectional area increases in the direction of flow. Fumes are introduced into the duct by ports or spaces in the roof of the furnace with the flow passage formed by the spaces or ports in the roof decreasing at the same rate as the duct cross-sectional area increases.

INVENTORS
ROBERT W. SPENCER
ROBERT S.L. ANDREWS
BY
Seidel, Gonda & Goldhammer
ATTORNEYS

FUME CONTROL METHOD AND APPARATUS

This invention relates to a method and apparatus for controlling fumes generated in a furnace such as a direct arc melting furnace. More particularly, the invention is directed to apparatus and method for a fume collecting system for a top charging direct arc furnace.

Heretofore, it has been proposed to connect the main stationary duct of the fume collection system to either a water-cooled elbow mounted in the dome of the refractory roof or to a plenum chamber surrounding the three electrode ports in the roof. This creates certain problems. When a water-cooled elbow is used, the necessary large diameter hole in the roof structure weakens it and shortens its useful life. In addition, the motions of raising and swinging the roof for replacement or charging the furnace introduces difficulties of maintaining telescoping joints under high temperature conditions.

When a side draft plenum chamber is used, it increases not only the rate of electrode consumption per ton of melted metal because of poor cooling but also the rate of refractory wear around the electrode ports in the roof. Moreover, both the water-cooled elbow and the side draft plenum chamber have a single take off point. This increases the draft velocity of the gas around the junction point so that small particulate metal charged material as well as fumes are drawn into the fume extraction system. The metal particles damage the blades of the suction fan which in turn causes breakdowns and loss of production. Attempts to overcome these difficulties heretofore have resulted in complex systems which are expensive to build and difficult to maintain in proper operation.

In accordance with the present invention, a circumferentially disposed collection duct is provided on the roof of the furnace. The duct communicates with the furnace by way of spaces or ports in the roof. The spaces or ports are formed by eliminating one or more of the bricks at spaced points around the periphery of the roof. The duct is connected through a port to a source of vacuum such as a suction fan. The cross-sectional area of the duct increases in the direction of flow toward the port and is at a minimum at a point diametrically opposite the port. The number of spaces for flow of gases into the duct decreases in the direction of flow at the same rate that the cross-sectional area of the duct increases.

It is an object of the present invention to provide a furnace fume control system that eliminates high fume and gas velocities at any location within the furnace body.

It is another object of the present invention to provide a fume control system for a furnace provided with a water-cooled seal to reduce the electrode consumption per ton of metal melted. In accordance with the present invention, it is now possible to use water-cooled seals around each of the electrode ports (usually three in number). Electrode consumption is reduced because more room is now available for the seals; hence a larger capacity cooling system can be provided. Stated otherwise, the electrode consumption is reduced by providing water-cooled seals and eliminating the necessity for drawing gaseous fumes upward and around the electrodes.

It is another object of the present invention to provide a fume control system which does not utilize telescoping or moving joints while still permitting the roof to be raised and swung for charging the furnace of changing the roof.

It is still a further object of the present invention to provide a furnace fume control system that will permit the furnace to be operated with a constant leakage factor thereby providing better operation of the damper controls on the overall extraction system to minimize metallurgical changes due to introduction of outside atmosphere into the furnace during automatic cycling when under operation conditions.

It is another object of the present invention to provide a fume control system and apparatus for a furnace which is simple, economical and reliable.

Other objects will appear hereinafter.

For the purpose of illustrating the invention, there is shown in the drawings a form which is presently preferred; it being understood, however, that this invention is not limited to the precise arrangements and instrumentalities shown.

Figure 1:
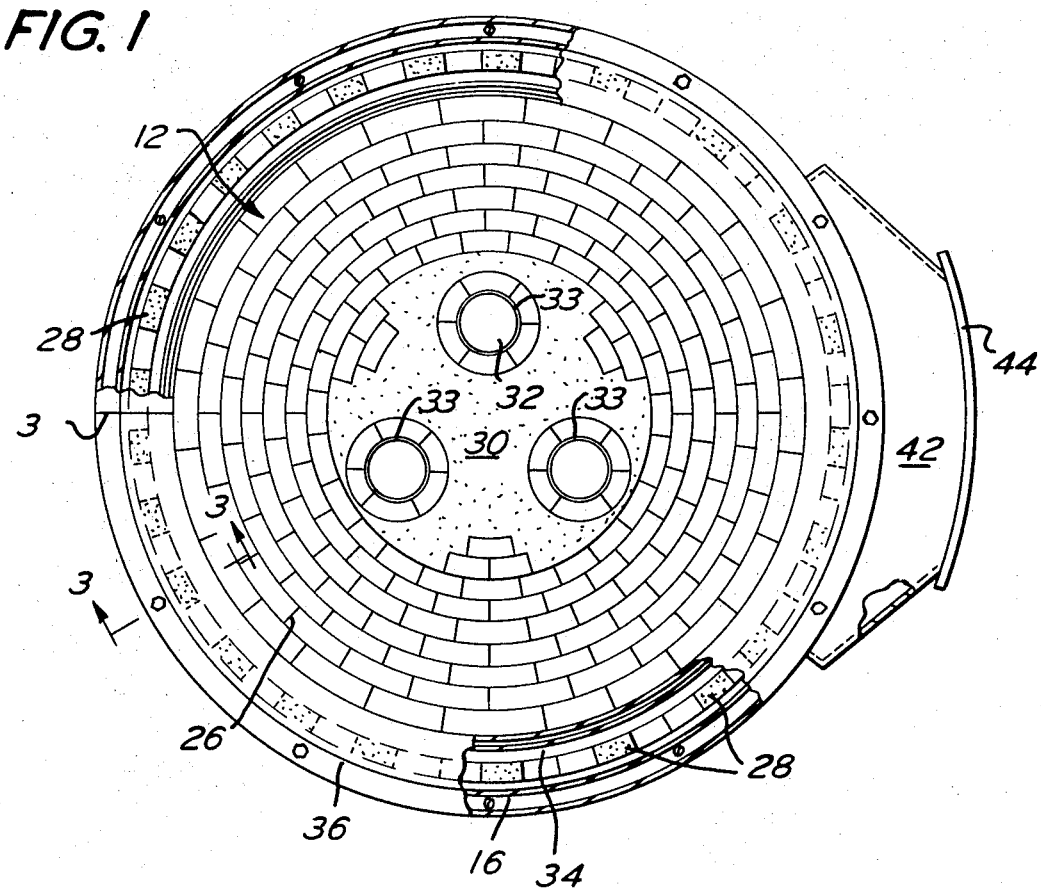
FIG. 1 is a top plan view of a furnace incorporating the fume control system of the present invention.

Referring to the drawing in detail, wherein like numerals indicate like elements, there is shown an arc furnace designated generally as 10 and having a domed refractory roof 12. Furnace 10 is a conventional arc furnace except as will be made clear hereinafter.

Figure 3:
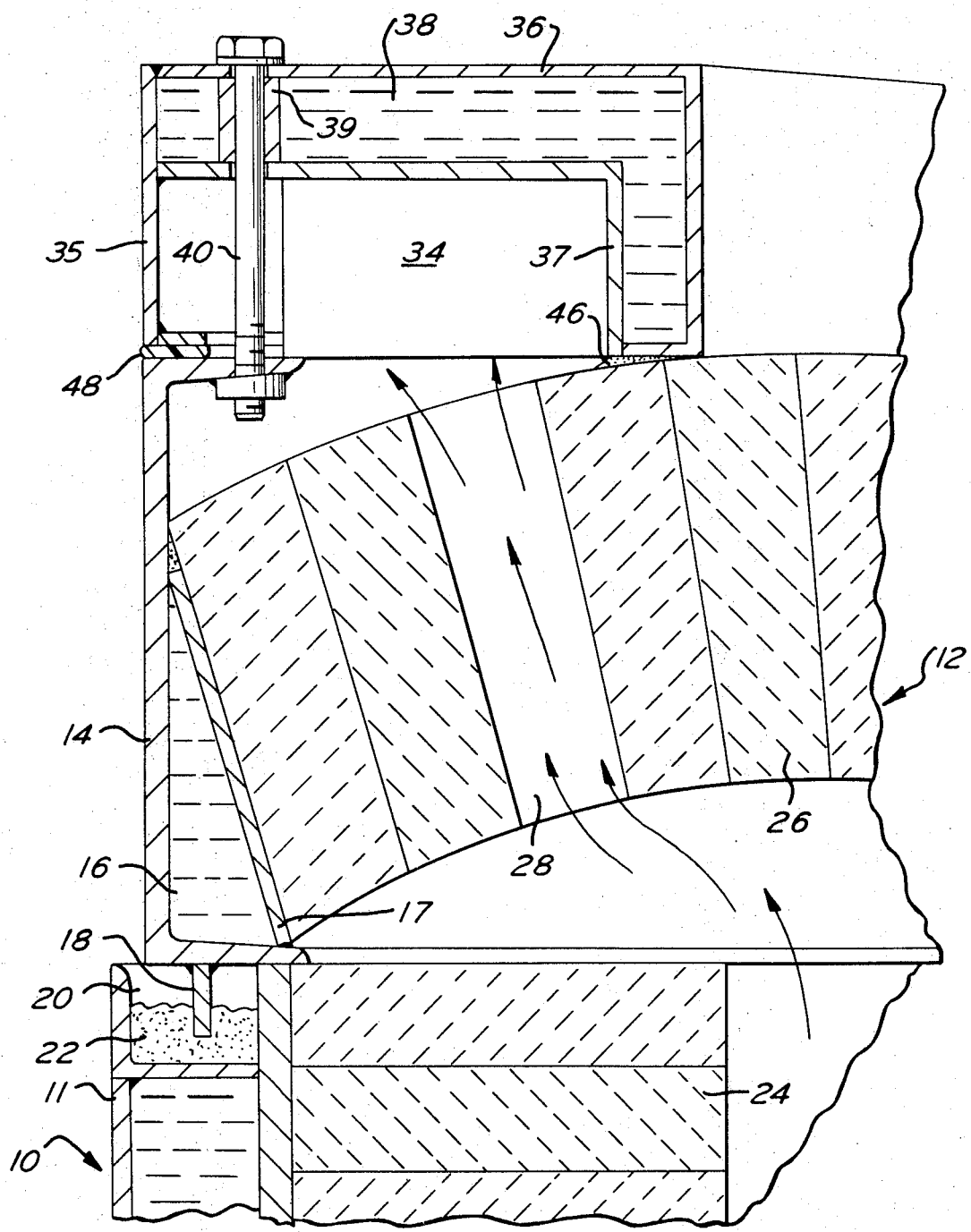
FIG. 3 is a sectional view taken along the line 3–3 in FIG. 1, but on an enlarged scale.

As shown more clearly in FIG. 3, a water-cooled roof ring 14 is provided with a plate 17 joined thereto at its upper and lower edges so as to define a water chamber 16. Plate 17 is at an angle to the vertical which may be referred to as a skew-back plate because it supports the first row of bricks. The ring 14 is provided with a leg 18 which extends downwardly into a channel 20 on the upper edge of the furnace shell 11. Sand 22 in the channel 20 provides a roof seal. The furnace 10 includes a lining of refractory 24 forming its sidewall in the conventional manner.

The roof 12 is formed of refractory bricks 26. Certain ones of the bricks are eliminated so as to form ports or open spaces 28 around the periphery of the roof. The ports 28 provide communication between the interior of the furnace 10 and a water-cooled exhaust duct 34 supported by the roof 12 and ring 14. Duct 34 is partitioned into two 180° segments by partition 33. Duct 34 is provided with a water jacket 36 thereby defining an L-shaped water coolant chamber 38. Duct 34 and jacket 36 are bolted to roof ring 14 at spaced points around the periphery by bolts 40, which extend through watertight sleeves 39.

The crown of roof 12 is formed by a monolithic rammed refractory center 30. The refractory center 30 is provided with a plurality of bricked electrode ports 32. A water-cooled seal 33 is mounted in each of the ports 32. The seals 33 are conventional in design and hence need not be described in detail. As shown in FIG. 1, three such ports lined with refractory bricks are illustrated.

The ports 28 are formed by a technique known as "checkering". Checkering consists of omitting bricks at regular points so as to form a checkered pattern of bricks and holes. In accordance with the present invention, the first four rows of bricks starting at the skew-back plate are checkered. Checkering commences at the point circumferentially farthest away from the transistion piece 42. At this farthest point, the checkering pattern is at a maximum; that is there is a larger number of holes. The number of openings is gradually decreased as the transistion piece is approached. Hence, there are a smaller number of openings adjacent the transistion piece than there are at the aforesaid starting point.

Figure 2:
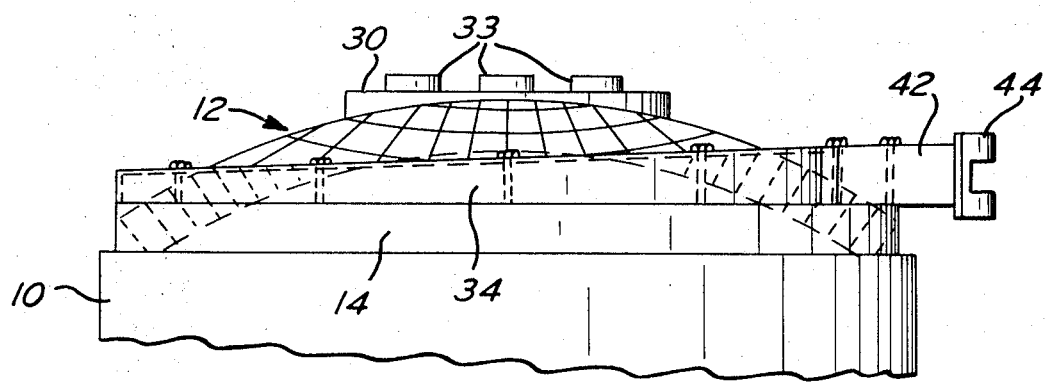
FIG. 2 is a partial side elevation view of the furnace in FIG. 1 showing the top portion thereof.

The duct 34 extends around the entire periphery of the roof and communicates with the transistion piece 42 which has a flange 44 adapted to be connected to a source of vacuum such as a suction fan or pump (not shown). The cross-sectional area of the duct 34 is at a minimum diametrically opposite the transistion piece 42 and increases in the direction of flow towards the transistion piece 42 as is apparent from FIG. 2. The checkered spacing of the ports 28 decreases in the direction of flow through the duct at the same rate that the cross-sectional area of duct 34 increases so as to maintain a substantially constant fume and gas velocity at all points where the fumes and gases leave the furnace 10. The graduated increase in the cross-sectional area of duct 34 is achieved by maintaining the width constant between walls 35 and 37 but increasing their height.

Referring to FIG. 3, it will be noted that the duct 34 and jacket 36 are sealed to the bricks 26 by refractory 46. A gasket seal 48 is provided between the duct 34 and the flange at the upper end of ring 14. Hence, fumes and gases which flow through ports 28 can only be removed by way of the transistion piece 42. It should be noted that the flange 44 on the transistion piece 42 is arcuate so as to mate with a corresponding flange on a conduit to be connected to the source of vacuum. The radius of curvature of flange 44 corresponds to the center of swing of the roof and bridge structure (not shown) used for raising the roof 12 from the shell 11.

In view of the above remarks, it will be apparent to those skilled in the art that the apparatus of the present invention and the method in which it is utilized maintains a substantially constant fume and gas velocity while achieving the objects of the invention. The constant velocity of gases creates uniform fume extraction rates over the surface of the furnace molten metal bath and hence a better quality product as well as a better furnace.

By providing the duct 42 with a constantly increasing cross-sectional area and mounting that duct in communication with the ports 28 which decrease in direct proportion to the increasing cross-sectional area of the duct, a constant flow rate is obtained throughout the furnace. This flow rate can be adjusted so that small particles are not picked up and drawn into the exhaust fan. Moreover, the uniform flow rate throughout the furnace permits the furnace to be operated with a constant known leakage factor. This is a distinct advantage since better control over the introduction of outside atmosphere is maintained. The rate of increase is chosen in accordance with the size and form of furnace being constructed.

The present invention may be embodied in other specific forms without departing from the spirit or essential attributes thereof.

I claim:

1. A furnace fume control exhaust method comprising removing fumes and gases from a furnace at a substantially constant rate by a cooled duct having a discharge port adapted to be connected to a source of low pressure, including the steps of increasing the flow path cross-sectional area of the duct in the direction of flow at a predetermined rate while decreasing at the same rate the number of flow paths for gases from the furnace to the duct in said direction of flow.

2. A method in accordance with claim 1 including mounting said duct on top of the roof for the furnace, and decreasing the flow path for gases from the furnace to the duct by increasing the space between adjacent flow ports in the roof in the direction of flow along said duct, and causing the gases and fumes to flow from the furnace through said ports in the roof to the duct.

3. Apparatus comprising a furnace, a roof on said furnace, a duct, said duct, having a discharge port adapted to be connected to a source of low pressure, said roof having discrete flow paths for communicating the interior of said furnace with said duct, the cross-sectional area of said duct increasing in the direction of flow towards said discharge port at a predetermined rate, and the number of said flow paths decreasing at said rate in the direction of flow.

4. Apparatus in accordance with claim 3 wherein said duct is water cooled and is supported by a water-cooled ring attached to the periphery of said roof.

5. Apparatus in accordance with claim 4 wherein said roof is removably supported on said furnace, said duct discharge port being in direct communication with a transistion piece, said transistion piece being provided with an arcuate flange, the radius of curvature of said flange corresponding to the radius of swing of said roof.

6. Apparatus comprising a furnace, a roof removably supported on said furnace to facilitate introduction of a charge into the furnace, a seal between said furnace and roof periphery, a duct around the periphery of said roof, a water jacket associated with said duct, said duct overlying the peripheral edge portion of said roof and being supported thereby, said duct having a discharge port, the cross-sectional area of said duct increasing in a direction from a point diametrically opposite said port in the direction of flow towards said port, said roof being provided with openings communicating said duct with the interior of said furnace at spaced points around the periphery of said roof, the distance between adjacent openings increasing in the direction of flow along said duct towards said port.

7. Apparatus in accordance with claim 6 wherein the duct width is constant, said roof being of refractory brick with said openings being formed by the spacing between bricks.

8. Apparatus in accordance with claim 6 wherein said roof is provided with a plurality of cooled electrode ports.